Aug. 28, 1923.

F. L. FURBUSH 1,466,094

SECTIONAL SQUEEZE ROLL

Filed Oct. 30, 1922

Witness
C. F. Wisson.

Inventor
F. L. Furbush
By attorneys
Southgate & Southgate.

Patented Aug. 28, 1923.

1,466,094

UNITED STATES PATENT OFFICE.

FRANK L. FURBUSH, OF WESTFORD, MASSACHUSETTS, ASSIGNOR TO C. G. SARGENT'S SONS CORPORATION, A CORPORATION OF MASSACHUSETTS.

SECTIONAL SQUEEZE ROLL.

Application filed October 30, 1922. Serial No. 597,703.

*To all whom it may concern:*

Be it known that I, FRANK L. FURBUSH, a citizen of the United States, residing at Westford, in the county of Middlesex and State of Massachusetts, have invented a new and useful Sectional Squeeze Roll, of which the following is a specification.

This invention relates to a sectional squeeze roll for use in scouring and other machines, in which fiber or fabric is passed between rolls to extract the water or other liquid therefrom.

The principal objects of this invention are to provide means for preventing the iron rings that hold the rubber sections from moving along the shaft when the bushings thereof are being pressed on the shaft; to provide means for holding the bushings and the iron ring positively against rotation on the shaft, and especially to provide these parts in such form that the rubber sections can be taken off the shaft easily when they need replacing without danger of injuring the other parts of the roll, and in such a way that the tapered bushings and the iron rings can both be saved and used over again.

The invention also involves the making of the rubber rings and iron sections in such relation to each other that when the sections are pressed together the iron rings will not come into contact so as to provide a tight joint between each two adjacent rubber sections.

Other objects and advantages of the invention will appear hereinafter.

Reference is to be had to the accompanying drawings, in which—

Figure 1:
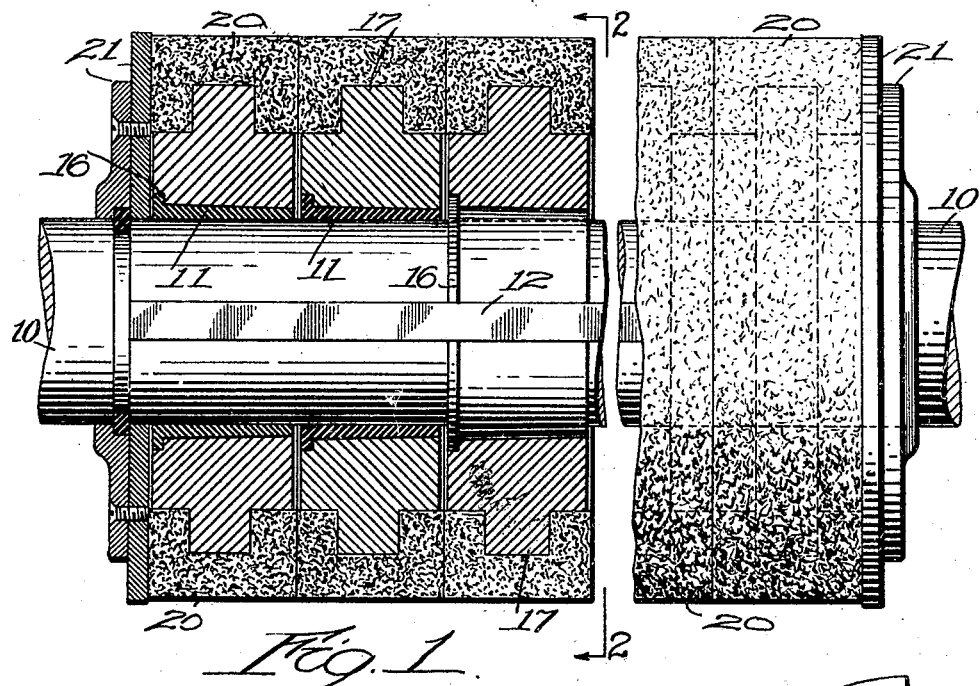
Fig. 1 is an elevation partly in central section of a squeeze roll for a wool scouring machine constructed in accordance with this invention.
Figure 2:
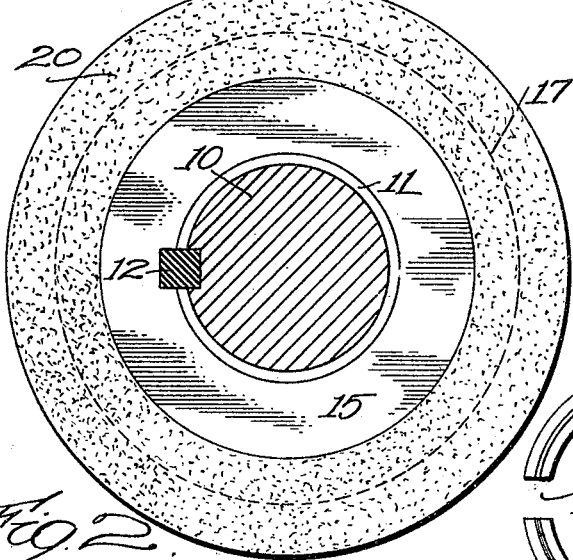
Fig. 2 is a sectional view of the same on the line 2—2 of Fig. 1 showing the iron ring and rubber section in elevation.
Figure 3:
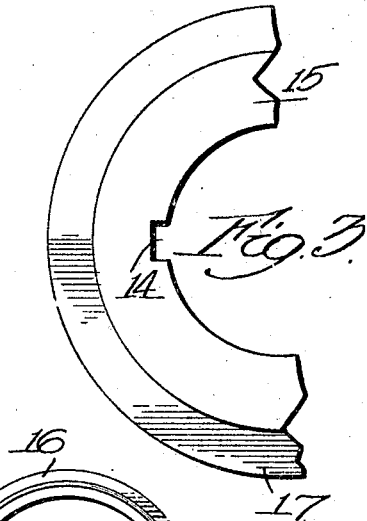
Fig. 3 is a similar view of one of the iron rings.
Figure 4:
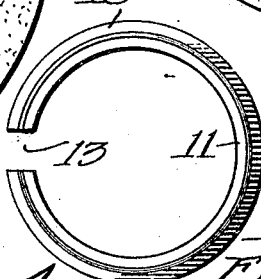
Fig. 4 is a similar view of one of the bushings for connecting it to the shaft.

This squeeze roll is intended to be used as one of a pair. One or both of these rolls may be made with rubber compressible outer surfaces, but usually one of them is made this way and the other is an ordinary metal roll of an unyielding character. The wool or other fiber coming out of the scouring machine full of liquid is squeezed between this pair of rolls in delivering it from the machine.

In the use of these rolls the rubber gets worn and wears unevenly throughout the length of the roll, which is quite long. That is the reason why they have been made in sections. These sections are intended to be replaced when worn, but heretofore it has been difficult to get them off and on for this purpose without injuring the iron rings on which they are mounted.

In order to provide for the replacement of the rolls easily and the use of the bushings and rings over again and secure the other objects above mentioned, I provide the shaft 10 on which the roll is mounted with a series of tapered bushings 11, and I cut a longitudinal keyway in the shaft and put it in a key 12 extending from one end of the roll to the other. Each of these bushings is cut all the way through at 13 to receive this key which projects beyond it into a keyway 14 in the iron ring 15 on the bushing. In this way the bushing and ring are both keyed to the shaft.

I prefer to make the tapered bushing with a small circular head 16 projecting beyond its tapered part and located at its large end. The ring 15 is provided with a marginal groove for receiving this head. This arrangement is provided to prevent the ring 15 going up further on the bushing when being pressed on the shaft. That would be liable to close it on the key and not let it go into place properly.

This spaces the rings also so that the rubber sections are also evenly spaced.

As has been the case heretofore, rubber sections 20 are vulcanized on the rings 15. In this case the rings are provided with circular projecting portions 17 for entering an annular groove in the corresponding rubber sections 20 for assisting in holding them on. The rubber sections are thicker than the rings 15 so that when pressed together on the shaft the iron rings will not come into contact. The importance of providing positive means 16 for properly spacing the rings will now be seen. The pressure of the contact is received at the edges of the rubber rings and they thus form a tight joint at the surface of the roll. The sections are held on the roll by end plates 21 of the usual construction and operation.

When the sections are pressed together by forcing the end plates toward each other the rubber sections are brought into close contact and form perfectly tight joints at the circumference of the roll. When it is desired to remove one of these sections one of the end plates is loosened and the iron rings can be released from the bushing very easily on account of the taper. Each bushing also can be removed very easily as it is cut all the way through to receive the key 12. The new ring with its rubber section is put on the bushing and the parts forced together tightly as stated. The iron ring removed is then supplied with a new rubber section which is vulcanized to it throughout their contacting surfaces and in such position that the edges of the section project beyond it a short distance, as for example, about a sixteenth of an inch on both sides. In this way the iron rings and bushings are not injured in the act of remounting and replacement, but they can be used over and over again.

Although I have illustrated and described only a single form of the invention I am aware of the fact that modifications can be made therein by any person skilled in the art without departing from the scope of the invention as expressed in the claims.

Therefore I do not wish to be limited to all the details of construction herein shown and described, but what I do claim is:—

1. A squeeze roll having a shaft and made up of a series of rubber sections, rings on which said sections are vulcanized, bushings on the shaft on each of which one of said rings is removably mounted, and means for positively connecting said bushings and rings to the shaft.

2. A rubber covered squeeze roll comprising a shaft having a longitudinal keyway with a key therein, a series of tapered bushings on said shaft, each of said bushings having a passage to permit said key to project through and beyond it, a series of iron rings located on said bushings and fitting their outer surfaces, each having a keyway into which said key projects, whereby the iron rings and bushings are positively keyed to the shaft, and a rubber section vulcanized at the exterior surface of each of said iron rings.

3. A rubber covered squeeze roll comprising a shaft having a longitudinal keyway with a key therein, a series of bushings tapered on their outer surfaces all in the same direction and located on said shaft, each of said bushings being cut all the way through to permit said key to project through and beyond them, a series of iron rings located on said bushings and fitting their outer surfaces, each having a keyway into which said key projects, whereby the iron rings and bushings are positively keyed to the shaft, and a rubber section vulcanized at the exterior surface of each of said iron rings, each bushing having a circular head at its larger end and each ring having an annular recess into which the head fits for limiting the motion of the ring on the bushing and spacing the rings all at the same distance apart.

4. A rubber covered squeeze roll comprising a shaft having a longitudinal keyway with a key therein, a series of bushings tapered on their outer surfaces all in the same direction and located on said shaft, each of said bushings being cut all the way through to permit said key to project through and beyond them, a series of iron rings located on said bushings and fitting their outer surfaces, each having a keyway into which said key projects, whereby the iron rings and bushings are positively keyed to the shaft, and a rubber section vulcanized at the exterior surface of each of said iron rings, the rubber sections each extending beyond the opposite surfaces of the iron ring, whereby when the sections are forced together on the shaft the rings will not come into contact endwise but the rubber sections will, so as to form a tight joint.

5. A rubber covered squeeze roll comprising a shaft, a series of bushings on said shaft, a series of iron rings located on said bushings, and a rubber section vulcanized at the exterior surface of each of said iron rings, the rubber sections each extending beyond the opposite surfaces of the iron ring, whereby when the sections are forced together on the shaft the rings will not come into contact endwise but the rubber sections will, so as to form a tight joint.

In testimony whereof I have hereunto affixed my signature.

FRANK L. FURBUSH.